United States Patent
Dibia

(10) Patent No.: US 12,518,447 B2
(45) Date of Patent: Jan. 6, 2026

(54) AUTOMATED GENERATION OF DATA VISUALIZATIONS AND INFOGRAPHICS USING LARGE LANGUAGE MODELS AND DIFFUSION MODELS

(71) Applicant: Microsoft Technology Licensing, LLC, Redmond, WA (US)

(72) Inventor: Victor Chukwuma Dibia, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 398 days.

(21) Appl. No.: 18/207,286

(22) Filed: Jun. 8, 2023

(65) Prior Publication Data

US 2024/0185490 A1    Jun. 6, 2024

Related U.S. Application Data

(60) Provisional application No. 63/429,354, filed on Dec. 1, 2022.

(51) Int. Cl.
```
G06T 11/20      (2006.01)
G06F 40/40      (2020.01)
G06N 20/00      (2019.01)
G06N 20/10      (2019.01)
```
(52) U.S. Cl.
CPC .......... *G06T 11/206* (2013.01); *G06F 40/40* (2020.01); *G06N 20/00* (2019.01); *G06N 20/10* (2019.01)

(58) Field of Classification Search
CPC ........ G06N 20/00; G06T 11/206; G06F 40/40
See application file for complete search history.

(56) References Cited

U.S. PATENT DOCUMENTS

```
2020/0293167 A1    9/2020  Blyumen
2021/0256202 A1*   8/2021  Raskovic ............... G06F 40/151
2022/0414320 A1*  12/2022  Dolan ................... G06F 40/166
```

OTHER PUBLICATIONS

International preliminary report on patentability received for PCT Application No. PCT/US2023/036967, mailed on Jun. 12, 2025, 11 pages.
Dibia, et al., "Data2Vis: Automatic Generation of Data Visualizations Using Sequence-to-Sequence Recurrent Neural Networks", In Journal of IEEE Computer Graphics and Applications, vol. 39, Issue 5, Sep. 1, 2019, pp. 33-46.
International Search Report and Written Opinion received for PCT Application No. PCT/US2023/036967, Feb. 6, 2024, 16 pages.
Wang et al., "Applying machine learning advances to data visualization: A survey on ml4vis", arXiv preprint arXiv:2012.00467, 2020, pp. 1-18.

* cited by examiner

*Primary Examiner* — Michelle L Sams

(57) ABSTRACT

Systems and methods are provided for generating visualization data associated with raw data using a machine learning model. For example, the machine learning model may automatically generate a set of candidate analytics and/or a scenario for visualizing the raw data based on summary data. Given the summary data and answers to prompts for visualizing data, the generated candidate analytics may reflect a context of the raw data as intended by the user. A visualization code scaffold according to a visualization specification may be used to generate programmatic output that corresponds to the candidate analytics, which may thus be used to generate a visualization accordingly. In some examples, an infographic may further be generated based on the visualization and a prompt using a diffusion model.

20 Claims, 8 Drawing Sheets

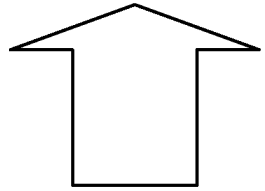

FIG. 3

Visualization Code Scaffold 302

```
from xyz.generator   import VisualGenerator
from xyz.codegen     import MyAICodeGenerator
from xyz.datamodel   import VisualGeneratorConfig
from xyz.validator   import Validator config = VisualGeneratorConfig(
    temperature=0.8,
    n=2,
    doc_string="A scatterplot showing horsepower
and miles per gallons for various cars.",
)
model =
    MyAICodeGenerator("myai",
        model="my-code-generator-001")
visualgen = VisualGenerator(model)
specs = visualgen.generate(config)
...
```

Visualization Code 304

```
import xyzair as xyz
def xyzair_plot(data):
    '''A scatterplot showing horsepower and miles per
gallons for various cars.''' chart =
xyz.Chart(data).mark_circle().encode(
        x='Horsepower',
        y='MPG',
        color='Origin',
        tooltip=['Name', 'Origin', 'Horsepower', 'MPG']
    ).interactive()

return chart chart = xyzair_plot(data)
```

AUTOMATED GENERATION OF DATA VISUALIZATIONS AND INFOGRAPHICS USING LARGE LANGUAGE MODELS AND DIFFUSION MODELS

CROSS-REFERENCE TO RELATED APPLICATIONS

This application claims priority to and the benefit of U.S. Provisional Patent Application No. 63/429,354, filed on Dec. 1, 2022, the disclosure of which is hereby incorporated herein by reference in its entirety.

BACKGROUND

Technologies involving visualizing data are becoming more popular with continued increases in data use and availability. Indeed, such visualizations increase accessibility to data. As more data become available, creating visualizations of data for viewers to understand the data effectively has become more complex. Some data are more substantive than other data to convey data trends. Different types of data become more useful than others depending on a context of the information in visualizing the data. Designing visualizations that are informative, interesting, and persuasive to viewers involves great effort and skill, which may limit the use of such visualizations and/or may result in visualizations that are less informative and/or persuasive, among other detriments.

It is with respect to these and other general considerations that the aspects disclosed herein have been made. In addition, although relatively specific problems may be discussed, it should be understood that the examples should not be limited to solving the specific problems identified in the background or elsewhere in this disclosure.

SUMMARY

Aspects of the present disclosure relate to a system for generating visualizations of raw data using a language model. Examples may generate summary data of the raw data. The summary data may represent thus a compact representation of the raw data and/or may add semantic types to the raw data. The summary data further include summary statistics associated with the raw data in some examples. The summary data may indicate some fields of data to be extracted for generating the visualizations. Given the summary data, the disclosed technology generates a visualization scenario for generating visualizations of the raw data. The visualization scenario represents a scenario that specifies a type of a visual representation of the raw data, one or more fields to be extracted for rendering relevant parts of the raw data for visualizations, and a context associated with the raw data. In particular, the embodiments use a language model to automatically generate a visualization scenario for visualizing the raw data. The user may have a level of control in the generation of a visualization scenario or may otherwise provide a visualization scenario to be used by aspects of the present disclosure. In examples, generating the visualization scenario further includes generating prompts and receiving answers to the prompts from the user that are used when generating the visualization scenario. For example, the prompts include requesting that the user identify one or more data fields that are more relevant in visualizing the raw data from the user's perspective. The language model thus incorporates the answers into generating the visualization scenario.

Given the visualization scenario, the disclosed technology automatically generates visualization code scaffolds for generating a visualization specification. Generating the visualization code scaffolds uses a generative machine learning model that can generate programmatic output (e.g., in addition to natural language output, as may be the case when the model is a multimodal generative model). For example, the machine learning model may generate programmatic output that specifies types and/or colors of a graphical expression for visualization of the data as specified by the visualization scenario. Examples may further include validating and/or filtering parts of the programmatic output to remove errors in rendering the visualizations. In some aspects, the disclosed technology generates the visualization code scaffolds using a language model that is not limited to the generative machine learning model. Additionally, or alternatively, the disclosed technology may generate the visualization code scaffolds based on existing visualization code scaffolds by retrieving the existing visualization code scaffolds from various sources including a database of example visualization code data, from a user input, and the like.

In some examples, the present disclosure generates an infographic from the resulting visualization of the data using a text-to-image generation model. Examples of the text-to-image generation model includes, but not limited to, a diffusion model. A diffusion model may generate image data based on given image data (e.g., the resulting visualization in two or higher in dimensions) and a prompt (e.g., text data). In examples, the prompt further specifies a context and features for the generated infographic. The diffusion model may thus select or otherwise generate an infographic according to one or more artistic styles, having a color scheme or palette, or any of a variety of other artistic adaptations of the visualization.

This Summary is provided to introduce a selection of concepts in a simplified form, which is further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the following description and, in part, will be apparent from the description, or may be learned by practice of the disclosure.

BRIEF DESCRIPTIONS OF THE DRAWINGS

Non-limiting and non-exhaustive examples are described with reference to the following figures.

FIG. 3 illustrates an example of a visualization code scaffold and an example of visualization code for generating visualization of an infographic in accordance with aspects of the present disclosure.

DETAILED DESCRIPTION

Figure 1:
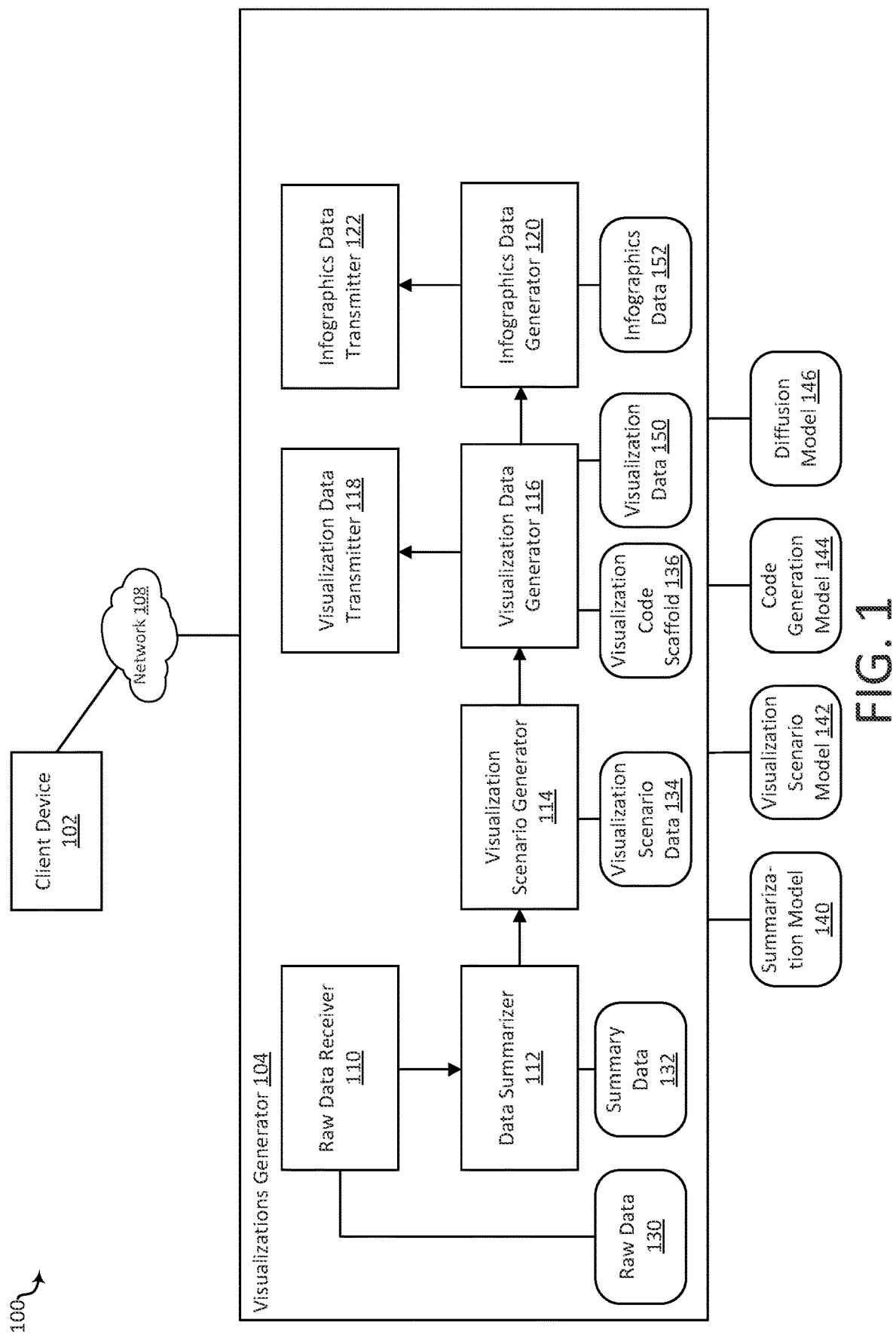
FIG. 1 illustrates an overview of an example system for generating visualizations of an infographic in accordance with aspects of the present disclosure.

There is an increasing number of situations where data are visualized for a variety of reasons. For example, a vast amount of data is generated by devices (e.g., sensors as a part of the Internet of Things) and semantics/statistics associated with the collected data are to be conveyed to users in a meaningful way. Visualizations make these and other data accessible to viewers by summarizing insights in large datasets. In particular, infographics have become a popular means to convey information to viewers using users, through graphics that represent data in a succinct way for the viewers to understand intuitively.

However, issues arise in generating visualizations and infographics of data when users are not familiar with or otherwise do not have the skills to create visuals that are meaningful and persuasive to viewers based on a set of data. For example, a set of data may take any of a variety of forms, including, but not limited to, a table with rows and columns. It is often difficult and confusing for a user to understand the meanings of columns and rows of such a table. As such, the user may have difficulty deriving meaning from the data, determining a context for the data, and/or determining which data is comparatively more relevant for visualizing (e.g., to convey data trends and/or semantics to the viewers).

Traditional systems that aim at helping the users generate visualizations of data are based on a few distinct approaches. Some traditional systems automated data visualizations based on pre-defined heuristics. However, developing heuristics-based system often includes manual work and is time-consuming.

Data analytics systems as disclosed below automatically generate visualizations in a variety of areas of data with robustness, while enabling the users to interactively acknowledge and control the generation process. For example, automatically generating a variety of contexts that may be contemplated from a set of data for visualization for selection by a user may reduce the burden on users. Further, automatically summarizing a set of input data and providing a summary of a set of data for interactively receiving user feedback to determine a context associated with the set of data may similarly improve the user's experience when visualizing a set of data. The system, based on the summary data, may automatically generate a visualization scenario (e.g., a scenario for selectively utilizing parts of the set of data that are relevant under the context) and prompt the user with the visualization scenario. Upon receiving user confirmation and/or corrections on the visualization scenario, the system may generate a visualization of the data accordingly.

As discussed in more detail below, the present disclosure relates to automatically generating visualizations of data. In particular, examples may use a generative machine learning model to process natural language input and perform a variety of tasks accordingly. The variety of tasks includes, but is not limited to, translating between languages, summarizing data, completing a sentence, generating prompts and predicted answers, and/or generating instructions and code in programming languages (also referred to herein as "programmatic output"). The machine learning model may be scalable in its performance by adding more parameters and data to the model. Furthermore, the model may be used to predict a reasonable result based on a limited or reduced number of examples. In some examples, the machine learning model may be fine-tuned to targeted areas of generating data. Examples of the targeted areas include generating programmatic output for one or more programming languages, answering questions, generating data based on a text-to-image model (e.g., a diffusion model), and the like.

Automatically generating visualizations according to the present disclosure are not limited to graphical representation of data. Additionally, or alternatively, the disclosed technology may generate an infographic based on a visualization by using declarative artificial intelligence, including a diffusion model or other text-to-image models as examples. The infographic may include images that are specifically designed to persuasively convey information to viewers.

Various aspects of the disclosure are described more fully below with reference to the accompanying drawings, which from a part hereof, and which show specific example aspects. However, different aspects of the disclosure may be implemented in many different ways and should not be construed as limited to the aspects set forth herein; rather, these aspects are provided so that this disclosure will be thorough and complete, and will fully convey the scope of the aspects to those skilled in the art. Practicing aspects may be as methods, systems, or devices. Accordingly, aspects may take the form of a hardware implementation, an entirely software implementation or an implementation combining software and hardware aspects. The following detailed description is, therefore, not to be taken in a limiting sense.

FIG. 1 illustrates an overview of an example system for generating visualizations of an infographic in accordance with aspects of the present disclosure. A system 100 includes a client device 102 and visualizations generator 104, interconnected by a network 108. In examples, the client device 102 generates a set of data (e.g., raw data) by collecting and aggregating data into a set. The client device 102 may include a sensor for generating sensor data as a set of raw data for visualization.

The visualizations generator 104 generates visualizations of raw data. Additionally, or alternatively, the visualizations generator 104 generates infographics data based on the visualizations of the data. The visualizations generator 104 includes raw data receiver 110, data summarizer 112, visualization scenario generator 114, visualization data generator 116, visualization data transmitter 118, infographics data generator 120, and infographics data transmitter 122. In examples, the visualizations generator 104 uses raw data 130, summary data 132, visualization scenario data 134, visualization code scaffold 136, visualization data 150, infographics data 152, summarization model 140, visualization scenario model 142, code generation model 144, and/or diffusion model 146.

The raw data receiver 110 receives raw data 130, for example from the client device 102 over the network 108. The raw data 130 may be in a variety of forms that can be summarized for generating visualizations. Examples of the raw data 130 include, but are not limited to, one or more tables that are formed by one or more columns and one or more rows of data. In examples, raw data 130 may be more than two dimensions. In aspects, the raw data 130 may include numerical data and/or textual data. The raw data 130 may represent statistical data. The raw data 130 may represent data values that are measured by counters and sensors over time and/or over distinct locations.

The data summarizer 112 generates summary data 132 based on the set of raw data 130. In aspects, the data summarizer 112 uses summarization model 140 for automatically generating the summary data 132. In examples, the data summarization model 140 receives the set of raw data as input and generates the summary data 132 in a natural language. The summarization model 140 determines a context associated with the set of raw data 130. In some aspects, the data summarizer 112 transmits the summary data 132 to the client device 102 to interactively present the summary data 132 and receive a feedback and/or correction to the summary data 132.

In aspects, the summary data 132 represent a compact representation of the set of raw data. The compaction may be based on variety of methods, including but not limited to a number of fields, semantic types associated with the set of raw data, and summary statistics including a mean and/or median value, the maximum value, and/or the minimum value. In another example, one or more regions of data may be more useful than another region of the data for use in visualizing the data. The data summarizer 112 may use a neural network for inferencing about one or more parts of the set of raw data. The data summarizer 112 may output the summary data 132 and context data that characterizes the summary data 132. In aspects, the context data is used to generate a title of the visualizations.

The visualization scenario generator 114 generates a visualization scenario for generating visualizations of the set of raw data 130 based on the summary data 132. In aspects, the visualization scenario represents a strategy and/a scenario for generating visualizations of the set of raw data based on a combination of the context and the summary data associated with the set of raw data (e.g., as was generated by data summarizer 112 and/or as may have been received from a user of the client device 102). For example, a visualization scenario indicates a correlation, relationship, insight, and/or visualization scenario within the data, such as which one or more columns of tabular raw data is to be used for generating visualizations.

The visualization scenario may thus specify data that are relevant for generating a visualization. Some columns of data may be used for plotting along axes of a multi-dimensional graph. Some other columns of data may be represented as distinct colors in the visualizations. The visualization scenario generator 114 uses a visualization scenario model 142. The visualization scenario model 142 generates a visualization scenario based on a combination of raw data 130 and textual summary data (e.g., the summary data 132). The visualization scenario model 142 reduces an amount of data that is used for subsequent processing and assigns columns of the set of raw data to distinct types for simplifying the visualization. The visualization scenario model 142 may be based on a machine learning model (e.g., a large language model, a generative model, and the like), such that the visualization scenario may be expressed in a natural language (e.g., Docstring data type).

In aspects, the visualization scenario generator 114 generates natural language output that includes a descriptive scenario for visualizing data. The descriptive scenario for visualizing data may include one or more hypotheses to be visualized by a visualization that is generated according to aspects described herein. For example, a hypothesis may indicate a question relating to the visualization data and/or a relationship between a first variable of the data and a second variable of data, such that a resulting visualization would plot or otherwise display the data accordingly (e.g., based on the first and second variables). It will be appreciated that, in other examples, any number of variables can be used. Further, in other examples, a user may provide natural language input that includes such a hypothesis. In some aspects, the visualization scenario generator 114 may output a list of scenario data that describes visualizing data. In some examples, the machine learning model generates and poses a question, such that the user may provide input (e.g., a revision to the question and/or an answer to the question) to guide the system to generate the descriptive scenario that is in-line with the user's intent The visualization data generator 116 generates instructions for programming visualizations according to one or more visualization specifications. In particular, the visualization data generator 116 generates code scaffold stubs using a machine learning model (e.g., a multimodal generative model). In examples, the natural language text includes the visualization scenario data 134. In aspects, the code scaffold specifies one or more graphics libraries to import into the programmatic code for rendering a visualization as specified by the visualization scenario.

In aspects, the visualization scenario generator 114 generates and presents one or more prompts to the user (e.g., via the client device 102) for confirming and/or correcting the visualization scenario. The prompts may be expressed in a natural language. The user may respond to the prompts by entering a response in a natural language. In other examples, the user may offer a new visualization scenario rather than editing or selecting a proposed visualization scenario from visualizations generator 104. The code scaffold stub may include example code to create a visualization and a textual description (e.g., Docstring) of the code scaffold that describes an intent for the visualization and how the code integrates information from the data. For example, the Docstring may indicate "a scatterplot showing horsepower and miles power gallons for various cars . . . " followed by programmatic code that defines the scatter plot and specifies data types for respective axes and colors for plotting the data. In examples, the code scaffold includes the visualization scenario that was confirmed by the user and/or the user may edit or further fine-tune the code for rendering the visualization data 150.

In aspects, the visualization data generator 116 uses a code generation model 144. The code generation model 144 may generate programmatic code (e.g., using a multimodal generative model), which may be in a declarative visualization language for rendering a visualization. As an example, the multimodal generative model uses the visualization scenario (e.g., in a natural language description) to generate programmatic code for rendering the visualizations. In aspects, the visualization data generator 116 may use one or more visualization libraries in a variety of programming languages. The visualization data generator 116 generates visualization code scaffolds as an output.

In aspects, the visualization data generator 116 generates a plurality of visualization code scaffolds. The visualization data transmitter 118 transmits the generated visualization data 150 to the client device 102 for viewing by the user. The generated visualization data 150 may include a rendered image of the visualization. For example, the client device 102 may display a scatterplot as was specified by the visualization code. A user may use client device 102 to interactively select and/or modify the code based on user commands. In examples, the visualization data generator 116 iteratively validates and filters visualization code to remove compilation and other errors in the visualization code.

In further aspects, the visualization data generator 116 may iteratively generate code scaffolds with high temperatures until satisfying predetermined criteria for generating visualization. Examples of the predetermined criteria include a threshold (e.g., five) for extracting non-error visualizations. The visualization data generator 116 may insert code and values into the visualization code scaffold, such that the final visualization code complies with a specification for declarative visualization. The visualization data generator 116 outputs visualization data 150 accordingly.

In some examples, the infographics data generator 120 generates an infographic based on a visualization of the set of raw data. An infographic refers to a graphical representation of data to persuasively convey information to a viewer. Unlike a visualization of the set of raw data, an infographic may more artistically convey specific aspects or characteristics to the viewers. In aspects, generating an infographic includes transforming a visualization into a form with some predetermined focus and/or combining the visualization with a description of an intent.

The infographics data generator 120 receives the visualization data 150 as rendered by executing the visualization code and generates infographics data 152 representing an infographic. In aspects, the infographics data generator 120 uses a diffusion model 146 to process the visualization data 150 and generate the infographics data 152 accordingly. For example, the diffusion model 146 receives the rendered image data of the visualization data 150 and uses a prompt (e.g., as may be provided by a user of the client device 102) that directs the diffusion model 146 to select one or more artistic styles for presenting the infographic to convey information. For example, the prompt may state that a visualization chart should be in shades of green and purple. Accordingly, the diffusion model 146 generates the infographic data 152 that include shades of the scattered plots in the visualization data 150 in green and purple. In some other examples, the prompt may indicate a visualization chart that appeals to some specific viewing audiences (e.g., teenagers, elderly, etc.) for the diffusion model to adapt artistic styles that attract intended audiences. The example system uses the diffusion model as an example of a text-to-image model and not limited to the diffusion model. Other models that transform types of data (e.g., text-to-image) may be used.

Figure 2:
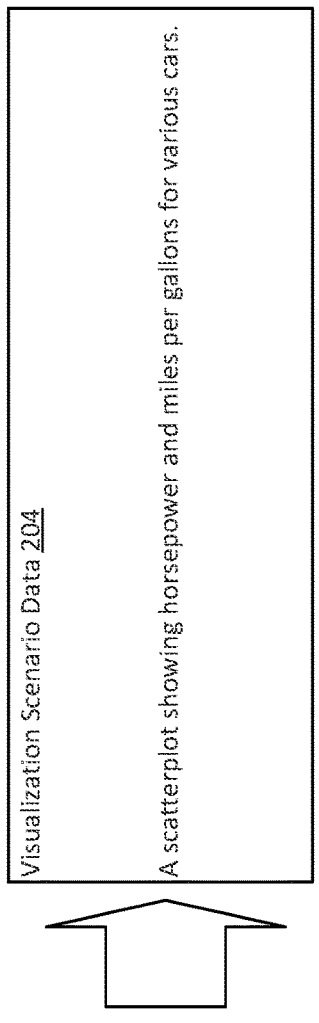
FIG. 2 illustrates an example of summary data and visualization scenario data for generating a visualization of an infographic in accordance with aspects of the present disclosure.

FIG. 2 illustrates an example of summary data and visualization scenario data for generating a visualization of an infographic in accordance with aspects of the present disclosure. Summary data 202 may indicate a summary of data fields of the raw data to be used for visualization. In aspects, the summary data 202 includes a title of a table of data (e.g., "Horsepower vs. Miles Per Gallon of Cars"; a number of columns in the table of data (e.g., three columns); and a number of rows in the table of data (e.g., 120 rows). The summary data 202 may further include a title of a first column (e.g., "index of cars"); a title of a second column (e.g., "Horsepower"), and a title of a third column (e.g., "Miles Per Gallon"). In aspects, the data summarizer (e.g., the data summarizer 112 as shown in FIG. 1) generates the summary data based on raw data (e.g., the raw data 130 as shown in FIG. 1) by using a machine learning model (e.g., the summarization model 140 as shown in FIG. 1).

The visualization scenario data 204 includes textual data that describes how the data is to appear after being visualized. In some aspects, the visualization scenario data 204 may indicate "a scatterplot showing horsepower and miles per gallons for various cars." In aspects, the visualization scenario generator (e.g., the visualization scenario generator 114 as shown in FIG. 1) may use a machine learning model (e.g., the visualization scenario model 142 as shown in FIG. 1) to output the visualization scenario data 204 by receiving the summary data 202 as input. Thus, visualization scenario data 204 provides one or more suggested visualizations from which a user may select a visualization for generation according to aspects described herein. For example, the visualization scenario data 204 specifies that the visualized data take a form of a scatterplot with horsepower and miles-per-gallon as titles for the x-axis and the y-axis respectively. In some aspects, the machine learning model may generate a list of questions associated with visualizing data by receiving the summary data as input. By the user interactively inputting answers to the list of questions, the machine learning model may further generate the visualization scenario data based on the user's answers accordingly (which may thus ultimately be used to generate a corresponding visualization).

FIG. 3 illustrates an example of a visualization code scaffold and an example of visualization code for generating visualization of an infographic in accordance with aspects of the present disclosure. In aspects, a visualization code scaffold 302 includes instructions for importing one or more libraries and a call to a function that generates a visualization code to visualize data. The visualization data generator (e.g., the visualization data generator 116 as shown in FIG. 1) may receive the visualization scenario data (e.g., visualization scenario data 134 as shown in FIG. 1; visualization scenario data 204 as shown in FIG. 2) as input and generates the visualization code scaffold 302. For example, the visualization code scaffold 302 includes code for importing libraries, code for calling a method to generate visualized data by specifying a visualization scenario data and invoking a command to generate a visualization code using a machine learning model. In aspects, the visualization code scaffold 302 may be in a form of a programming language (e.g., a python language) that integrates information from the visualization scenario data associated with various fields and a type of a data chart (e.g., a scatterplot).

Visualization code 304 includes a set of code to visualize data. In aspects, the visualization code 304 includes instructions to import libraries and instructions to generate a chart (e.g., a scatterplot) that plots the data. Examples of the instructions to generate a chart may set values needed for plotting data (e.g., a title of the x-axis (e.g., "Horsepower"), a title of the y-axis (e.g., "MPG"), a color of plotting (e.g., "Origin"), and tool tip data for the chart (e.g., "Name," "Origin," Horsepower," and "MPG"). In some aspects, visualization data generator (e.g., the visualization data generator 116 as shown in FIG. 1) generates the visualization code 304 by compiling or otherwise processing the visualization code scaffold 302. In some other aspects, the visualization code is interactively editable by a user.

Figure 4:
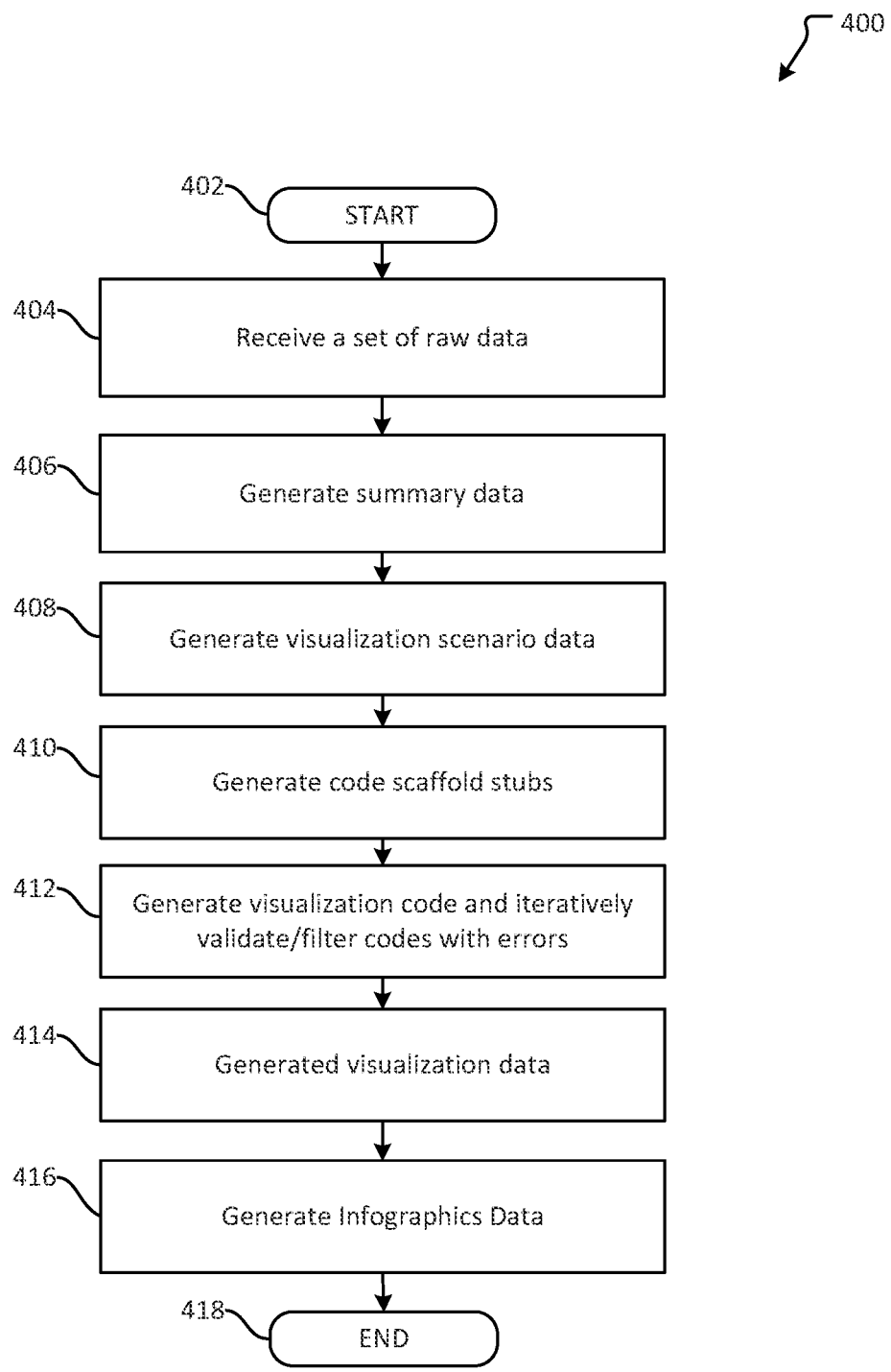
FIG. 4 illustrates an example of a method for generating visualizations of an infographic in accordance with aspects of the present disclosure.

FIG. 4 illustrates an example of a method 400 for automatically generating visualizations by using a large language model. A general order of the operations for the method 400 in FIG. 4 is provided. Generally, the method 400 begins with start operation 402. The method 400 may include more or fewer steps or may arrange the order of the steps differently than those shown in FIG. 4. The method 400 can be executed as a set of computer-executable instructions executed by a computer system and encoded or stored on a computer readable medium. Further, the method 400 can be performed by gates or circuits associated with a processor, an ASIC, an FPGA, a SOC or other hardware device. Hereinafter, the method 400 shall be explained with reference to the systems, components, devices, modules, software, data structures, data characteristic representations, signaling diagrams, methods, etc., described in conjunction with FIGS. 1-3 and 5-7.

Following start operation 402, the method 400 begins with receive operation 404, in which a set of raw data is received. In aspects, the set of raw data includes a set of data in a tabular structure. Values of data may be based on data generated by a sensor, survey data (e.g., raw answer data from a survey), historical log data, and the like.

At generate summary data operation 406, summary data (e.g., the summary data 132 as shown in FIG. 1) is generated based on the set of raw data. The generate summary data operation 406 includes generating a compact representation of the set of raw data, for example by replacing select columns and fields of data by summary statistics data. Examples of the summary statistics data may include mean/median values, maximum values, minimum values, and/or a selection of one or more regions of the tabular data. Types of data in the summary data may include numerical and/or textual data. The summary data operation 406 may add semantic types to columns by inferencing. A machine learning model may be used for the inferencing in some examples. The generate summary data operation 406 determines a context associated with the set of raw data and extracts data that are relevant in depicting the context. Additionally, or alternatively, the generate summary data operation 406 includes interactively receiving one or more corrections to the summary candidate data from the user and generating the summary data by updating the summary candidate data.

At generate visualization scenario data operation 408, visualization scenario data is generated based on the summary data with a context. As discussed above, the visualization scenario data may describe a strategy for generating visualizations. In aspects, the generate visualization scenario data operation 408 uses a machine learning model to generate a list of questions that may be of interest to the user for generating a visualization from the set of raw data. For example, the machine learning model may use the summary data and the context (e.g., as may have been generated at summary data operation 406) to generate natural language output that includes a descriptive scenario for visualizing data. The descriptive scenario for visualizing data may include one or more hypotheses that predict how the data are to appear as being visualized. The user may thus receive the list of scenario data that describes visualizing data. In some examples, the machine learning model generates and poses a question, such that the user may provide input (e.g., a revision to the question and/or an answer to the question) to guide the system to generate the descriptive scenario that is in-line with the user's intent.

In aspects, the visualization scenario may specify a number of columns of data to use, a visualization technique (e.g., a type of a graph) to be used for generating visualizations, and/or which data to use to optimize for visualizing the set of raw data according to the context, among other examples.

In some aspects, the generate visualization scenario data operation 408 may include generating a set of questions for the user to answer. In examples, the list of questions includes questions that ask about aspects of the set of raw data that are more relevant than others, such as which fields appear to be more useful to the user for visualizations. The generate visualization scenario data operation 408 may thus use answers to the list of questions that are received from the user to determine whether one or more fields of the data are more relevant than another field based on relevance to the answers. Such interactivity enables the user to confirm that the visualization scenario conforms to the user's intent and thus enables the system to generate visualizations as expected by the user.

At generate code scaffold stubs operation 410, one or more visualization code scaffold stubs are generated based on the visualization scenario data. The code scaffolds are generated by using a multimodal machine learning model to generate programmatic output that is based on a textual description (e.g., as may include the above-generated visualization scenario). In aspects, the multimodal machine learning model receives the visualization scenario data (e.g., textual data, image data, or in other forms of data) as input data and outputs a code scaffold in a textual form. In examples, a code scaffold includes a set of instructions that imports one or more libraries that are used to render the visualization of data. It will be appreciated that, in some examples, at least a part of a code scaffold is user-provided and/or is accessed from a repository of code scaffolds, among other examples. Thus, a code scaffold as used herein need not be produced by a generative model or may be in part produced by a generative model, among other examples. A code scaffold may comply with a declarative visualization specification. In some examples, the code scaffold includes a visualization scenario in Docstring, which describes a context for the visualization that is to be generated.

At generate visualization code operation 412, visualization code for rendering one or more visualizations (e.g., visualization data) is generated. In examples, the multimodal generative model may further generate additional programmatic code that is consistent with a predetermined visualization specification (e.g., including a user of one or more visualization code libraries). The generate visualization code operation 412 may include iteratively validating and filtering one or more parts of the visualization code, for example to remove programmatic code that causes a compilation error or results in unintended behavior, among other examples. The iterations may continue until satisfying a predetermined condition for error removals.

At generate visualization data operation 414, visualization data that corresponds to the visualizations of the set of raw data is generated. In examples, the visualization data may be rendered as raster image data. For example, visualization data operation 414 may include executing the programmatic code that was generated by the multimodal machine learning model at operation 412, as discussed above.

At generate infographics data operation 416, an infographic is generated based on the visualization data that was generated at operation 414. In aspects, the generate infographics data operation 416 uses a diffusion model to generate the infographic. For example, the diffusion model receives the rendered image data of the visualizations and a prompt with which to generate an infographic. The prompt may describe a type and/or a context associated with the infographic. For example, the diffusion model may select or otherwise determine one or more artistic styles to process the visualization data to generate the infographic accordingly. The method 400 ends with the end operation 418. The diffusion model is an example of a text-to-image model. Other types of a text-to-image model or a model that generate image data based on one or more types of data as input may be used to generate the infographic.

As should be appreciated, operations 402-418 are described for purposes of illustrating the present methods and systems and are not intended to limit the disclosure to a particular sequence of steps, e.g., steps may be performed in different order, additional steps may be performed, and disclosed steps may be excluded without departing from the present disclosure.

Figure 5A:
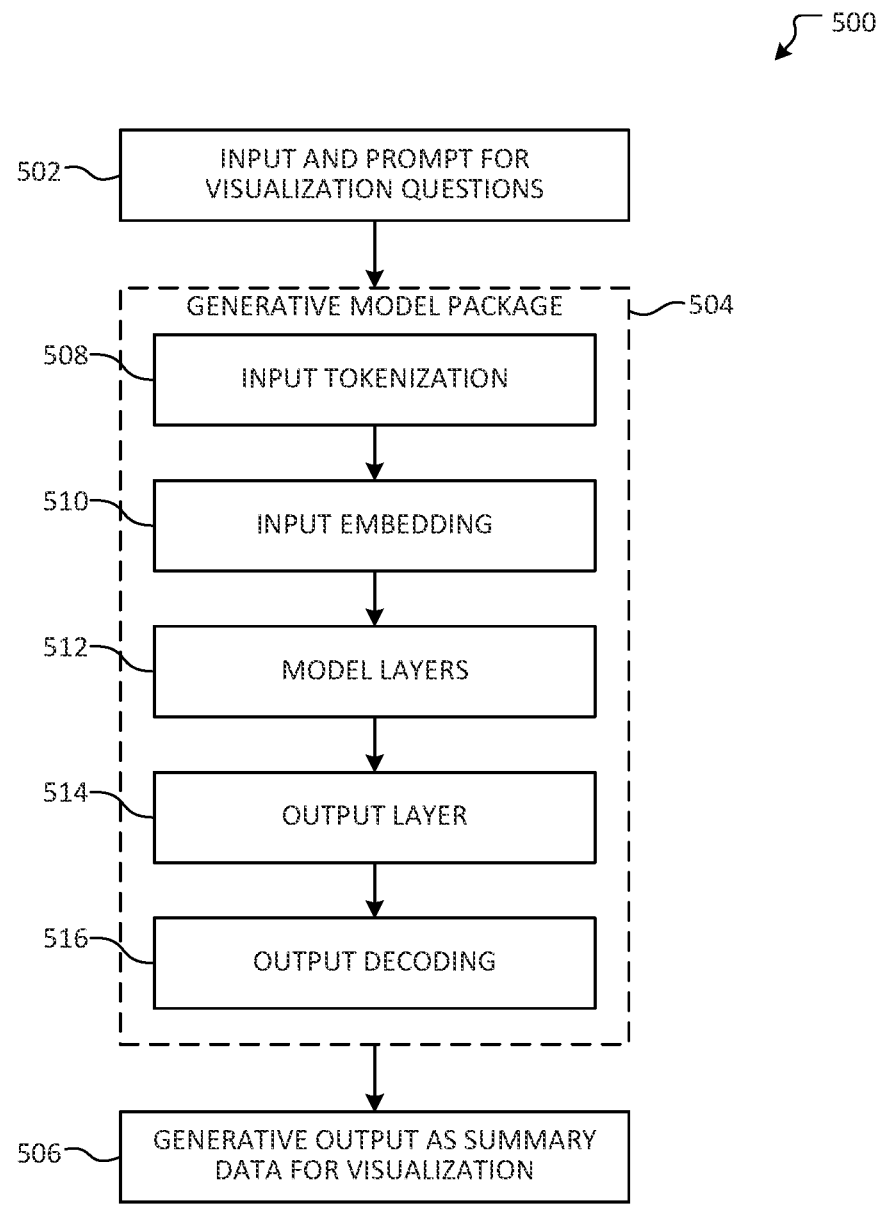
FIGS. 5A and 5B illustrate overviews of an example generative machine learning model that may be used according to aspects of the present disclosure.
Figure 5B:
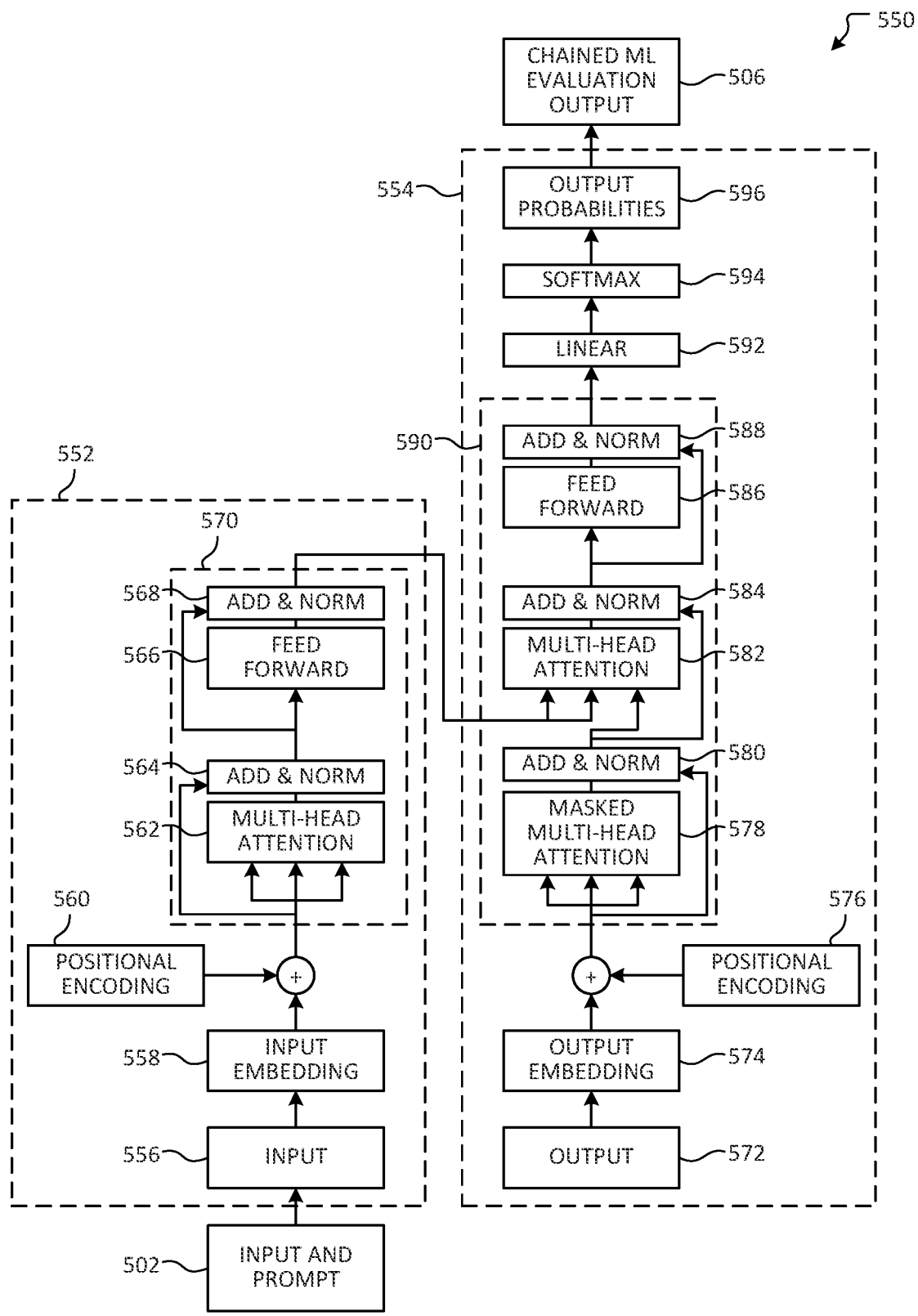

FIGS. 5A and 5B illustrate overviews of an example generative machine learning model that may be used according to aspects described herein. With reference first to FIG.

5A, conceptual diagram 500 depicts an overview of pretrained generative model package 504 that processes an input and a prompt 502 to generate model output for hypothesis for visualization 506 according to aspects described herein. Examples of pre-trained generative model package 504 includes, but is not limited to, Megatron-Turing Natural Language Generation model (MT-NLG), Generative Pre-trained Transformer 3 (GPT-3), Generative Pre-trained Transformer 4 (GPT-4), BigScience BLOOM (Large Openscience Open-access Multilingual Language Model), DALL-E, DALL-E 2, Stable Diffusion, or Jukebox.

In examples, generative model package 504 is pre-trained according to a variety of inputs (e.g., a variety of human languages, a variety of programming languages, and/or a variety of content types) and therefore need not be finetuned or trained for a specific scenario. Rather, generative model package 504 may be more generally pre-trained, such that input 502 includes a prompt that is generated, selected, or otherwise engineered to induce generative model package 504 to produce certain generative model output 506. For example, a prompt includes a context and/or one or more completion prefixes that thus preload generative model package 504 accordingly. As a result, generative model package 504 is induced to generate output based on the prompt that includes a predicted sequence of tokens (e.g., up to a token limit of generative model package 504) relating to the prompt. In examples, the predicted sequence of tokens is further processed (e.g., by output decoding 516) to yield output 506. For instance, each token is processed to identify a corresponding word, word fragment, or other content that forms at least a part of output 506. It will be appreciated that input 502 and generative model output 506 may each include any of a variety of content types, including, but not limited to, text output, image output, audio output, video output, programmatic output, and/or binary output, among other examples. In examples, input 502 and generative model output 506 may have different content types, as may be the case when generative model package 504 includes a generative multimodal machine learning model.

As such, generative model package 504 may be used in any of a variety of scenarios and, further, a different generative model package may be used in place of generative model package 504 without substantially modifying other associated aspects (e.g., similar to those described herein with respect to FIGS. 1, 2, 3, 4, 6, 7, and 8). Accordingly, generative model package 504 operates as a tool with which machine learning processing is performed, in which certain inputs 502 to generative model package 504 are programmatically generated or otherwise determined, thereby causing generative model package 504 to produce model output 506 that may subsequently be used for further processing.

Generative model package 504 may be provided or otherwise used according to any of a variety of paradigms. For example, generative model package 504 may be used local to a computing device (e.g., visualization generator 104 in FIG. 1) or may be accessed remotely from a machine learning service (e.g., client device 102). In other examples, aspects of generative model package 504 are distributed across multiple computing devices. In some instances, generative model package 504 is accessible via an application programming interface (API), as may be provided by an operating system of the computing device and/or by the machine learning service, among other examples.

With reference now to the illustrated aspects of generative model package 504, generative model package 504 includes input tokenization 508, input embedding 510, model layers 512, output layer 514, and output decoding 516. In examples, input tokenization 508 processes input 502 to generate input embedding 510, which includes a sequence of symbol representations that corresponds to input 502. Accordingly, input embedding 510 is processed by model layers 512, output layer 514, and output decoding 516 to produce model output 506. An example architecture corresponding to generative model package 504 is depicted in FIG. 5B, which is discussed below in further detail. Even so, it will be appreciated that the architectures that are illustrated and described herein are not to be taken in a limiting sense and, in other examples, any of a variety of other architectures may be used.

FIG. 5B is a conceptual diagram that depicts an example architecture 550 of a pre-trained generative machine learning model that may be used according to aspects described herein. As noted above, any of a variety of alternative architectures and corresponding ML models may be used in other examples without departing from the aspects described herein.

As illustrated, architecture 550 processes input 502 to produce generative model output 506, aspects of which were discussed above with respect to FIG. 5A. Architecture 550 is depicted as a transformer model that includes encoder 552 and decoder 554. Encoder 552 processes input embedding 558 (aspects of which may be similar to input embedding 510 in FIG. 5A), which includes a sequence of symbol representations that corresponds to input 556. In examples, input 556 includes input and prompt 502 for visualization questions, aspects of which may be similar to raw data 130 received by the raw data receiver 110, and/or a prompt that was generated based on the raw data 130 according to aspects described herein.

Further, positional encoding 560 may introduce information about the relative and/or absolute position for tokens of input embedding 558. Similarly, output embedding 574 includes a sequence of symbol representations that correspond to output 572, while positional encoding 576 may similarly introduce information about the relative and/or absolute position for tokens of output embedding 574.

As illustrated, encoder 552 includes example layer 570. It will be appreciated that any number of such layers may be used, and that the depicted architecture is simplified for illustrative purposes. Example layer 570 includes two sub-layers: multi-head attention layer 562 and feed forward layer 566. In examples, a residual connection is included around each layer 562, 566, after which normalization layers 564 and 568, respectively, are included.

Decoder 554 includes example layer 590. Similar to encoder 552, any number of such layers may be used in other examples, and the depicted architecture of decoder 554 is simplified for illustrative purposes. As illustrated, example layer 590 includes three sub-layers: masked multi-head attention layer 578, multi-head attention layer 582, and feed forward layer 586. Aspects of multi-head attention layer 582 and feed forward layer 586 may be similar to those discussed above with respect to multi-head attention layer 562 and feed forward layer 566, respectively. Additionally, masked multi-head attention layer 578 performs multi-head attention over the output of encoder 552 (e.g., output 572). In examples, masked multi-head attention layer 578 prevents positions from attending to subsequent positions. Such masking, combined with offsetting the embeddings (e.g., by one position, as illustrated by multi-head attention layer 582), may ensure that a prediction for a given position depends on known output for one or more positions that are less than the given position. As illustrated, residual connections are also included around layers 578, 582, and 586, after which normalization layers 580, 584, and 588, respectively, are included.

Multi-head attention layers 562, 578, and 582 may each linearly project queries, keys, and values using a set of linear projections to a corresponding dimension. Each linear projection may be processed using an attention function (e.g., dot-product or additive attention), thereby yielding n-dimensional output values for each linear projection. The resulting values may be concatenated and once again projected, such that the values are subsequently processed as illustrated in FIG. 5B (e.g., by a corresponding normalization layer 564, 580, or 584).

Feed forward layers 566 and 586 may each be a fully connected feed-forward network, which applies to each position. In examples, feed forward layers 566 and 586 each include a plurality of linear transformations with a rectified linear unit activation in between. In examples, each linear transformation is the same across different positions, while different parameters may be used as compared to other linear transformations of the feed-forward network.

Additionally, aspects of linear transformation 592 may be similar to the linear transformations discussed above with respect to multi-head attention layers 562, 578, and 582, as well as feed forward layers 566 and 586. Softmax 594 may further convert the output of linear transformation 592 to predicted next-token probabilities, as indicated by output probabilities 596. It will be appreciated that the illustrated architecture is provided in as an example and, in other examples, any of a variety of other model architectures may be used in accordance with the disclosed aspects. In some instances, multiple iterations of processing are performed according to the above-described aspects (e.g., using generative model package 504 in FIG. 5A or encoder 552 and decoder 554 in FIG. 5B) to generate a series of output tokens (e.g., words), for example which are then combined to yield a complete sentence (and/or any of a variety of other content). It will be appreciated that other generative models may generate multiple output tokens in a single iteration and may thus use a reduced number of iterations or a single iteration.

Accordingly, output probabilities 596 may thus form output 506 as summary data for visualization according to aspects described herein, such that the output of the generative ML model (e.g., which may include structured output) is used as input for subsequent steps of generating visualization scenario data and code scaffold stubs for further generating a visualization code according to aspects described herein (e.g., similar to the generate visualization scenario data operation 408 and the generate code scaffold stubs operation 410 in FIG. 3.

Figure 6:
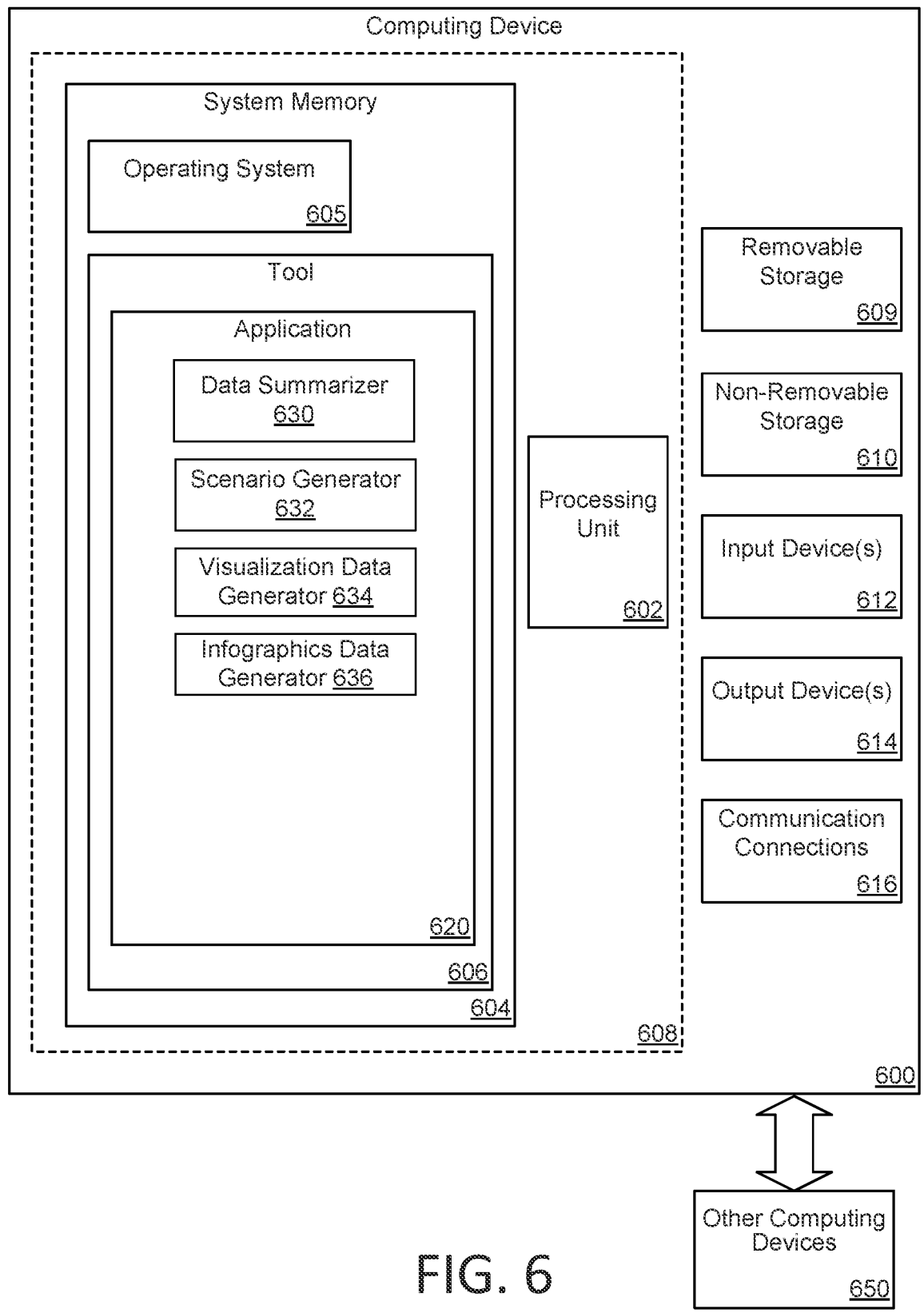
FIG. 6 illustrates an example of a computing device with which aspects of the present disclosure may be practiced.

FIG. 6 is a block diagram illustrating physical components (e.g., hardware) of a computing device 600 with which aspects of the disclosure may be practiced. The computing device components described below may be suitable for the computing devices described above. In a basic configuration, the computing device 600 may include at least one processing unit 602 and a system memory 604. Depending on the configuration and type of computing device, the system memory 604 may comprise, but is not limited to, volatile storage (e.g., random access memory), non-volatile storage (e.g., read-only memory), flash memory, or any combination of such memories. The system memory 604 may include an operating system 605 and one or more program tools 606 suitable for performing the various aspects disclosed herein such. The operating system 605, for example, may be suitable for controlling the operation of the computing device 600. Furthermore, aspects of the disclosure may be practiced in conjunction with a graphics library, other operating systems, or any other application program and is not limited to any particular application or system. This basic configuration is illustrated in FIG. 6 by those components within a dashed line 608. The computing device 600 may have additional features or functionality. For example, the computing device 600 may also include additional data storage devices (removable and/or non-removable) such as, for example, magnetic disks, optical disks, or tape. Such additional storage is illustrated in FIG. 6 by a removable storage device 609 and a non-removable storage device 610.

As stated above, a number of program tools and data files may be stored in the system memory 604. While executing on the at least one processing unit 602, the program tools 606 (e.g., an application 620) may perform processes including, but not limited to, the aspects, as described herein. The application 620 includes data summarizer 630, scenario generator 632, visualization data generator 634, and infographics data generator 636 as described in more details in FIG. 1. Other program tools that may be used in accordance with aspects of the present disclosure may include electronic mail and contacts applications, word processing applications, spreadsheet applications, database applications, slide presentation applications, drawing or computer-aided application programs, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 6 may be integrated onto a single integrated circuit. Such an SOC device may include one or more processing units, graphics units, communications units, system virtualization units, and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 600 on the single integrated circuit (chip). Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general-purpose computer or in any other circuits or systems.

The computing device 600 may also have one or more input device(s) 612, such as a keyboard, a mouse, a pen, a sound or voice input device, a touch or swipe input device, etc. The output device(s) 614 such as a display, speakers, a printer, etc. may also be included. The aforementioned devices are examples and others may be used. The computing device 600 may include one or more communication connections 616 allowing communications with other computing devices 650. Examples of the communication connections 616 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program tools. The system memory 604, the removable storage device 609, and the non-removable storage device 610 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 600. Any such computer storage media may be part of the computing device 600. Computer storage media does not include a carrier wave or other propagated or modulated data signal.

Communication media may be embodied by computer readable instructions, data structures, program tools, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 7:
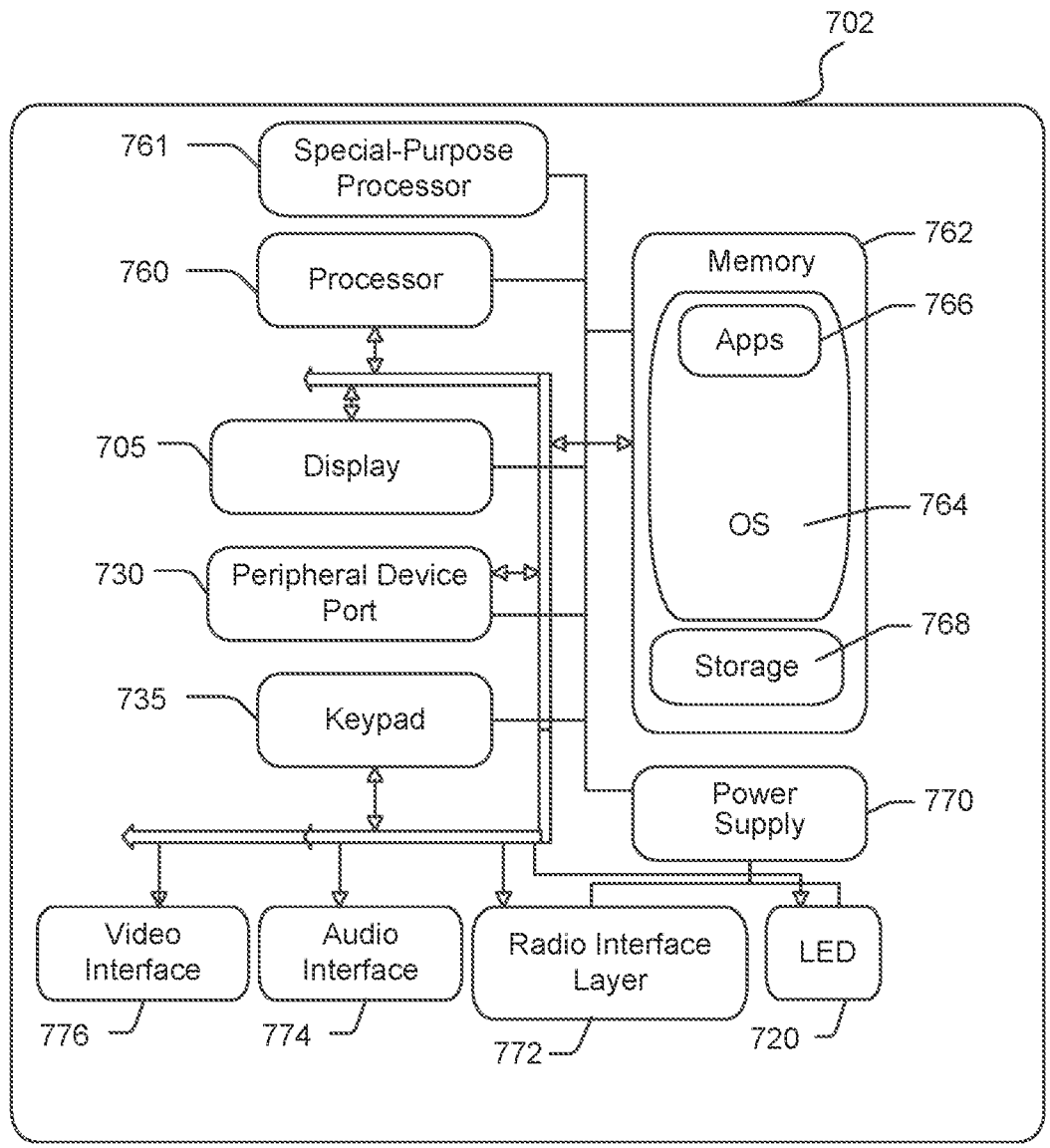
FIG. 7 is another simplified block diagram of a computing device with which aspects of the present disclosure may be practiced.

FIG. 7 illustrates an example block diagram illustrating the architecture of one aspect of computing device (e.g., the client device 102, as shown in FIG. 1), a server (e.g., the visualizations generator 104, as shown in FIG. 1), a mobile computing device, etc. That is, the computing device 700 can incorporate a system 702 (e.g., a system architecture) to implement some aspects. The system 702 can implemented as a "smart phone" capable of running one or more applications (e.g., browser, e-mail, calendaring, contact managers, messaging clients, games, and media clients/players). In some aspects, the system 702 is integrated as a computing device, such as an integrated digital assistant (PDA) and wireless phone.

One or more application programs 766 may be loaded into the memory 762 and run on or in association with the operating system 764. Examples of the application programs include phone dialer programs, e-mail programs, information management (PIM) programs, word processing programs, spreadsheet programs, Internet browser programs, messaging programs, and so forth. The system 702 also includes a non-volatile storage area 768 within the memory 762. The non-volatile storage area 768 may be used to store persistent information that should not be lost if the system 702 is powered down. The application programs 766 may use and store information in the non-volatile storage area 768, such as e-mail or other messages used by an e-mail application, and the like. A synchronization application (not shown) also resides on the system 702 and is programmed to interact with a corresponding synchronization application resident on a host computer to keep the information stored in the non-volatile storage area 768 synchronized with corresponding information stored at the host computer. As should be appreciated, other applications may be loaded into the memory 762 and run on the computing device 700 described herein.

The system 702 has a power supply 770, which may be implemented as one or more batteries. The power supply 770 might further include an external power source, such as an AC adapter or a powered docking cradle that supplements or recharges the batteries.

The system 702 may also include a radio interface layer 772 that performs the function of transmitting and receiving radio frequency communications. The radio interface layer 772 facilitates wireless connectivity between the system 702 and the "outside world" via a communications carrier or service provider. Transmissions to and from the radio interface layer 772 are conducted under control of the operating system 764. In other words, communications received by the radio interface layer 772 may be disseminated to the application programs 766 via the operating system 764, and vice versa.

The visual indicator 720 (e.g., LED) may be used to provide visual notifications, and/or an audio interface 774 may be used for producing audible notifications via the audio transducer 725. In the illustrated configuration, the visual indicator 720 is a light emitting diode (LED) and the audio transducer 725 is a speaker. These devices may be directly coupled to the power supply 770 so that when activated, they remain on for a duration dictated by the notification mechanism even though the processor 760 and other components might shut down for conserving battery power. The LED may be programmed to remain on indefinitely until the user takes action to indicate the powered-on status of the device. The audio interface 774 is used to provide audible signals to and receive audible signals from the user. For example, in addition to being coupled to the audio transducer 725, the audio interface 774 may also be coupled to a microphone to receive audible input, such as to facilitate a telephone conversation. In accordance with aspects of the present disclosure, the microphone may also serve as an audio sensor to facilitate control of notifications, as will be described below. The system 702 may further include a video interface 776 that enables an operation of devices connected to a peripheral device port 730 to record still images, video stream, and the like.

A computing device 700 implementing the system 702 may have additional features or functionality. For example, the computing device 700 may also include additional data storage devices (removable and/or non-removable) such as, magnetic disks, optical disks, or tape. Such additional storage is illustrated in FIG. 7 by the non-volatile storage area 768.

Data/information generated or captured by the computing device 700 and stored via the system 702 may be stored locally on the computing device 700, as described above, or the data may be stored on any number of storage media that may be accessed by the device via the radio interface layer 772 or via a wired connection between the computing device 700 and a separate computing device associated with the computing device 700, for example, a server computer in a distributed computing network, such as the Internet. As should be appreciated such data/information may be accessed via the computing device 700 via the radio interface layer 772 or via a distributed computing network. Similarly, such data/information may be readily transferred between computing devices for storage and use according to well-known data/information transfer and storage means, including electronic mail and collaborative data/information sharing systems.

The description and illustration of one or more aspects provided in this application are not intended to limit or restrict the scope of the disclosure as claimed in any way. The claimed disclosure should not be construed as being limited to any aspect, for example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

The present disclosure relates to systems and methods for generating visualizations of data using a large language model according to at least the examples provided in the sections below. The method comprises receiving a set of raw data; generating, based on the set of raw data, summary data using a first machine learning model; generating, using a second machine learning model, one or more candidate analytics for the set of raw data that specify a context associated with a visualization of the set of raw data; generating, based on the one or more candidate analytics and the set of raw data, a visualization code scaffold using a third machine learning model, wherein the visualization code scaffold includes at least a part of the candidate analytics as textual data and programmatic code for rendering at least a part of the set of raw data according to the summary data; generating visualization data associated with the set of raw data using visualization programmatic code that was generated from the visualization code scaffold; and providing the visualization data for display to a user. The method further comprises generating, based on the visualization data and a prompt, infographic data using a diffusion model. The prompt is received from a computing device of the user. The one or more candidate analytics are generated based on the summary data. The method further comprises receiving a user selection of a candidate analytic from the generated one or more candidate analytics for the set of raw data. The third machine learning model is a multimodal generative machine learning model. The summary data comprises a compacted representation of the set of raw data.

In another aspect, a system for generating visualization data based on a set of data is provided. The system comprises a memory; and a processor configured to execute steps comprising: receiving a set of raw data; generating, based on the set of raw data, summary data using a first machine learning model; generating, using a second machine learning model, one or more candidate analytics for the set of raw data that specify a context associated with a visualization of the set of raw data; generating, based on a visualization code scaffold, the one or more candidate analytics, and the set of raw data, and using a third machine learning model, visualization programmatic code for rendering at least a part of the set of raw data according to the summary data; generating visualization data associated with the set of raw data using visualization programmatic code; and providing the visualization data for display to a user. The processor further configured to execute steps comprises generating, based on the visualization data and a prompt, infographic data using a diffusion model. The prompt is received from a computing device of the user. The one or more candidate analytics are generated based on the summary data. The processor further configured to execute steps comprises receiving a user selection of a candidate analytic from the generated one or more candidate analytics for the set of raw data. The third machine learning model is a multimodal generative machine learning model. The summary data comprises a compacted representation of the set of raw data.

In yet another aspect, a device for generating visualization data based on a set of data is provided. The device comprises a memory; a processor configured to execute a method comprising: receiving a set of raw data; generating, based on the set of raw data, summary data using a first machine learning model; generating, using a second machine learning model, one or more candidate analytics for the set of raw data that specify a context associated with a visualization of the set of raw data; generating, based on a visualization code scaffold, the one or more candidate analytics, and the set of raw data, and using a third machine learning model, visualization programmatic code for rendering at least a part of the set of raw data according to the summary data; generating visualization data associated with the set of raw data using visualization programmatic code; and providing the visualization data for display to a user. The processor is further configured to execute a method comprising: generating, based on the visualization data and a prompt, infographic data using a diffusion model. The prompt is received from a computing device of the user. The one or more candidate analytics are generated based on the summary data. The processor is further configured to execute a method comprising: receiving a user selection of a candidate analytic from the generated one or more candidate analytics for the set of raw data. The third machine learning model is a multimodal generative machine learning model, and wherein the summary data comprises a compacted representation of the set of raw data.

Any of the one or more above aspects in combination with any other of the one or more aspect. Any of the one or more aspects as described herein.

The invention claimed is:

1. A method for generating visualization data based on a set of data, comprising:
   receiving a set of raw data;
   generating, based on the set of raw data, summary data using a first machine learning model;
   generating, using a second machine learning model, one or more candidate analytics for the set of raw data that specify a context associated with a visualization of the set of raw data;
   generating, based on a visualization code scaffold, the one or more candidate analytics, and the set of raw data, and using a third machine learning model, visualization programmatic code for rendering at least a part of the set of raw data according to the summary data;
   generating visualization data associated with the set of raw data using visualization programmatic code; and
   providing the visualization data for display to a user.

2. The method of claim 1, further comprising:
   generating, based on the visualization data and a prompt, infographic data using a diffusion model.

3. The method of claim 2, wherein the prompt is received from a computing device of the user.

4. The method of claim 1, wherein the one or more candidate analytics are generated based on the summary data.

5. The method of claim 1, further comprising receiving a user selection of a candidate analytic from the generated one or more candidate analytics for the set of raw data.

6. The method of claim 1, wherein the third machine learning model is a multimodal generative machine learning model.

7. The method of claim 1, wherein the summary data comprises a compacted representation of the set of raw data.

8. A system for generating visualization data based on a set of data, the system comprising:
a memory; and
a processor configured to execute steps comprising:
receiving a set of raw data;
generating, based on the set of raw data, summary data using a first machine learning model;
generating, using a second machine learning model, one or more candidate analytics for the set of raw data that specify a context associated with a visualization of the set of raw data;
generating, based on a visualization code scaffold, the one or more candidate analytics, and the set of raw data, and using a third machine learning model, visualization programmatic code for rendering at least a part of the set of raw data according to the summary data;
generating visualization data associated with the set of raw data using visualization programmatic code; and
providing the visualization data for display to a user.

9. The system of claim 8, the processor further configured to execute steps comprising:
generating, based on the visualization data and a prompt, infographic data using a diffusion model.

10. The system of claim 9, wherein the prompt is received from a computing device of the user.

11. The system of claim 8, wherein the one or more candidate analytics are generated based on the summary data.

12. The system of claim 8, the processor further configured to execute steps comprising:
receiving a user selection of a candidate analytic from the generated one or more candidate analytics for the set of raw data.

13. The system of claim 8, wherein the third machine learning model is a multimodal generative machine learning model.

14. The system of claim 8, wherein the summary data comprises a compacted representation of the set of raw data.

15. A device for generating visualization data based on a set of data, the device comprising:
a memory;
a processor configured to execute a method comprising:
receiving a set of raw data;
generating, based on the set of raw data, summary data using a first machine learning model;
generating, using a second machine learning model, one or more candidate analytics for the set of raw data that specify a context associated with a visualization of the set of raw data;
generating, based on a visualization code scaffold, the one or more candidate analytics, and the set of raw data, and using a third machine learning model, visualization programmatic code for rendering at least a part of the set of raw data according to the summary data;
generating visualization data associated with the set of raw data using visualization programmatic code; and
providing the visualization data for display to a user.

16. The device of claim 15, the processor further configured to execute a method comprising:
generating, based on the visualization data and a prompt, infographic data using a diffusion model.

17. The device of claim 16, wherein the prompt is received from a computing device of the user.

18. The device of claim 15, wherein the one or more candidate analytics are generated based on the summary data.

19. The device of claim 15, the processor further configured to execute a method comprising:
receiving a user selection of a candidate analytic from the generated one or more candidate analytics for the set of raw data.

20. The device of claim 15, wherein the third machine learning model is a multimodal generative machine learning model, and
wherein the summary data comprises a compacted representation of the set of raw data.

* * * * *